United States Patent [19]

Delalande

[11] Patent Number: 5,044,070

[45] Date of Patent: Sep. 3, 1991

[54] METHOD AND APPARATUS FOR THE FABRICATION OF WIRE ANODES FOR ELECTROLYTIC CAPACITORS

[75] Inventor: François Delalande, Saint Pierre de Bresse, France

[73] Assignee: Compagnie Europeenne de Composants Electroniques LCC, Courbevoie, France

[21] Appl. No.: 495,416

[22] Filed: Mar. 19, 1990

[30] Foreign Application Priority Data

Mar. 31, 1989 [FR] France ............................ 89 04255

[51] Int. Cl.$^5$ ..................... H01R 43/00; B23P 19/00
[52] U.S. Cl. ................... 29/825; 29/25.35; 29/731; 140/71 C; 264/251
[58] Field of Search .............. 140/71 C; 493/464; 29/825, 854, 25.42, 25.35, 731; 264/251, 167

[56] References Cited

U.S. PATENT DOCUMENTS

| | | | |
|---|---|---|---|
| 1,862,263 | 6/1932 | Gottsehalk | 140/71 C |
| 3,398,223 | 8/1968 | Schatz et al. | 493/464 X |
| 3,403,303 | 9/1968 | Klein | 29/825 X |
| 4,715,118 | 12/1987 | Bernard . | |
| 4,811,914 | 3/1989 | Pelalande . | |

FOREIGN PATENT DOCUMENTS

| | | | |
|---|---|---|---|
| 1496345 | 9/1967 | France . | |
| 228767 | 9/1943 | Switzerland | 264/251 |

Primary Examiner—Carl J. Arbes
Attorney, Agent, or Firm—Pollock, VandeSande & Priddy

[57] ABSTRACT

Disclosed is a method for the fabrication of wire anodes for electrolytic capacitors, the wires being obtained by the compacting of a wire, made of anodizable material, in the cavity of a compression sleeve under the effect of a piston, the wire going through the piston from one side to the other along the axis to its movement and through the sleeve by passing into its cavity. Also disclosed is a device for the implementation of the method.

3 Claims, 3 Drawing Sheets

FIG_1
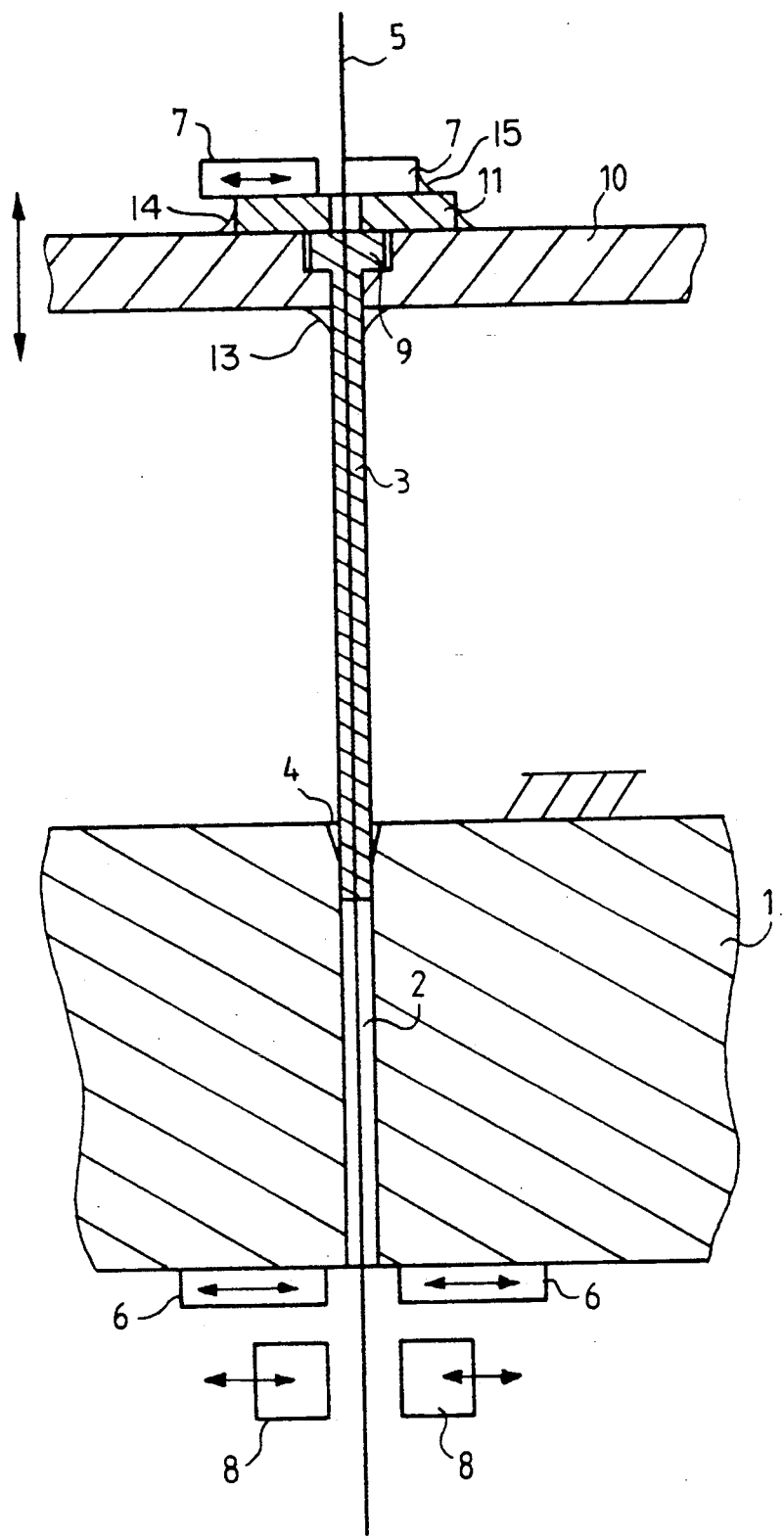

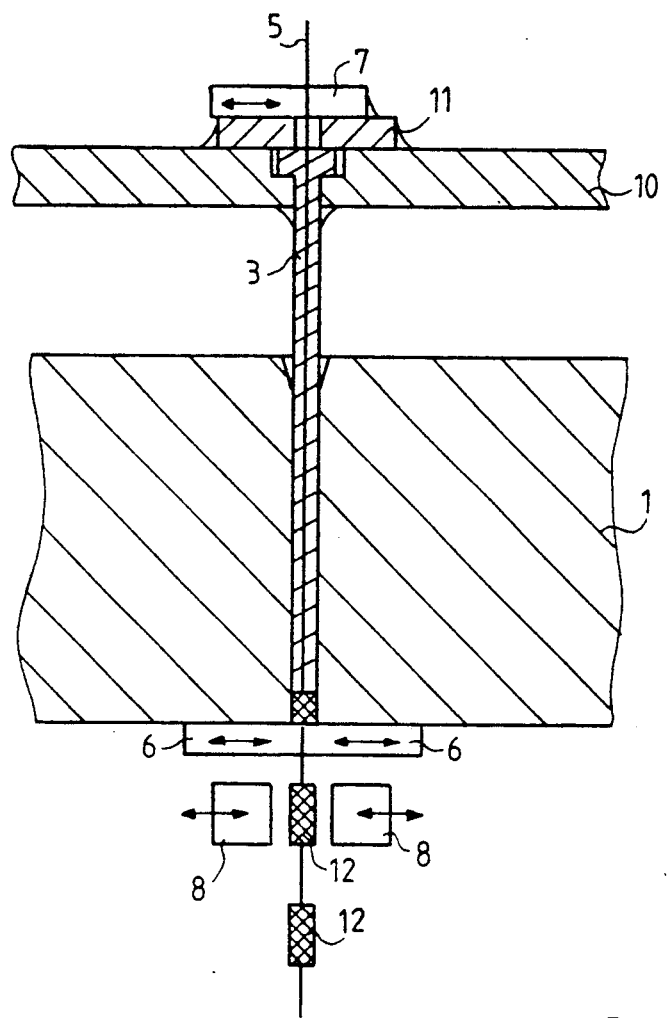
FIG_3
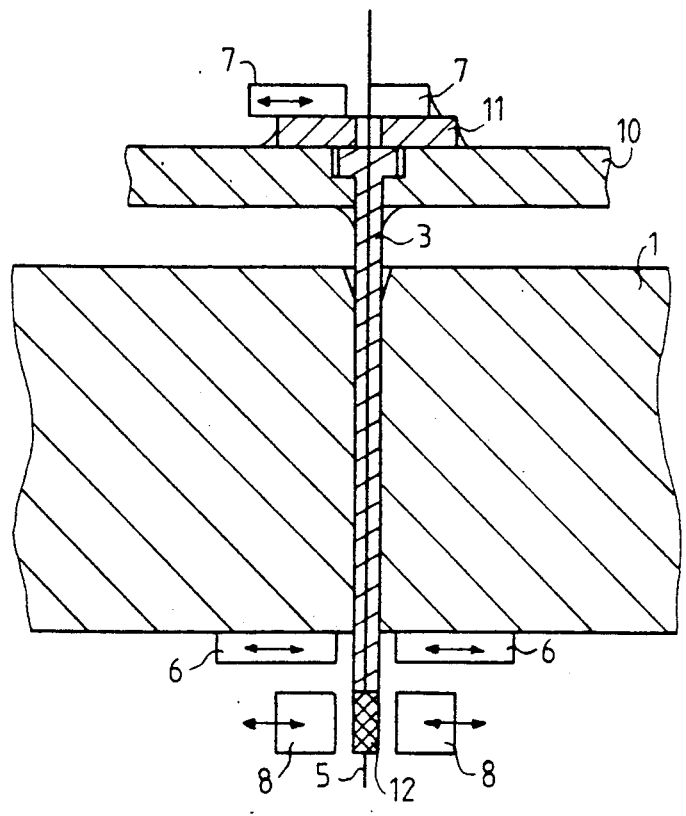
FIG_2

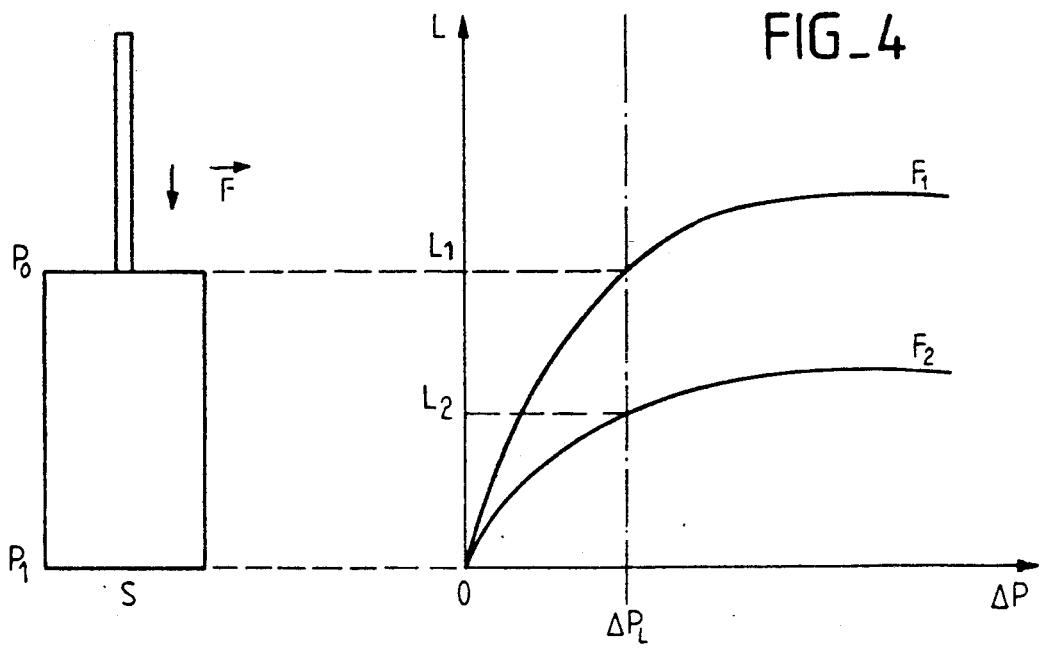
*PRIOR ART*
FIG_4
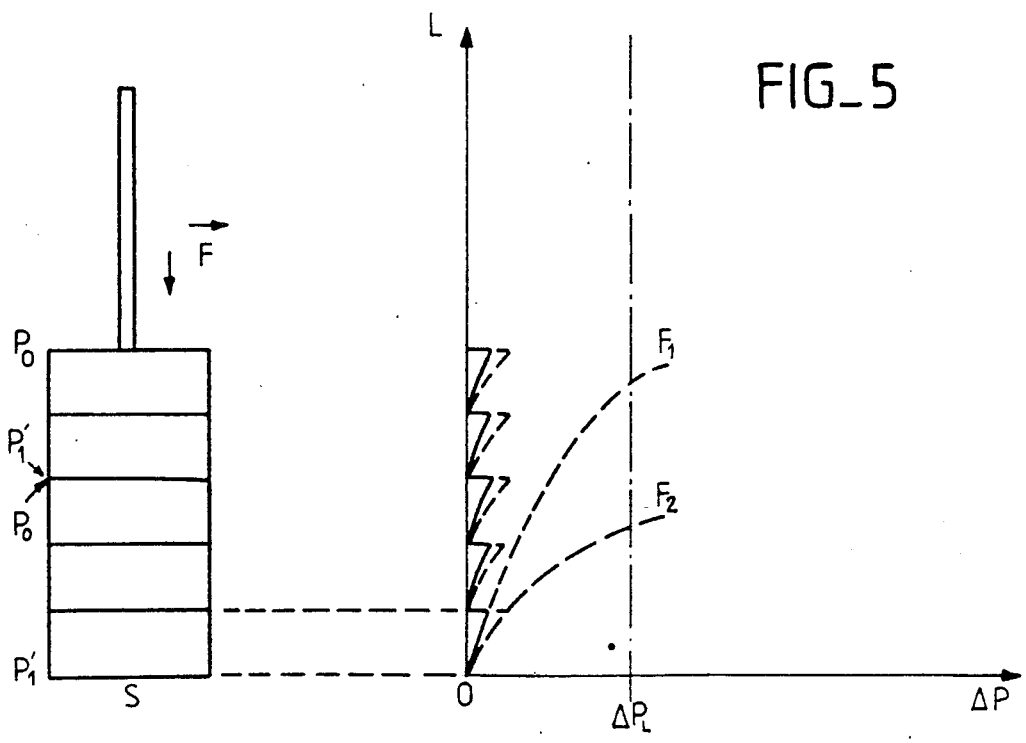
FIG_5

METHOD AND APPARATUS FOR THE FABRICATION OF WIRE ANODES FOR ELECTROLYTIC CAPACITORS

BACKGROUND OF THE INVENTION

1. Field of the Invention

The present invention concerns a method for the fabrication of wire anodes for electrolytic capacitors. It also concerns a device enabling the implementation of this method.

2. Description of the Prior Art

Electrolytic capacitors are used above all because of their high capacitance in a small volume. At present, there are three classes of electrolytic capacitors on the market, having a low CxV product. There are aluminium and liquid electrolyte capacitors: the anode is made of aluminium and the cathode is an electrolytic liquid. There are also tantalum and solid electrolyte capacitors: the anode is made of tantalum and the cathode is a solid semiconductor electrolyte. Finally, there are aluminium and solid electrolyte capacitors: the anode is made of aluminium and the cathode is a solid semiconductor electrolyte.

Of late, the last-named class has definitely seen development. The firm Philips has developed several ranges of aluminium and solid electrolyte capacitors. The anode is made with a wound or folded foil. The method of fabrication with a foil anode comprises the following steps:

- cutting out the aluminium foil;
- etching the foil;
- folding the etched aluminium foil in the case of radial capacitors or winding it in the case of axial capacitors;
- anodizing the foil to form a thin film of alumina;
- forming the solid electrolyte (manganese dioxide) by pyrolysis;
- positioning the cathode.

The method used to fabricate these capacitors is quite complicated. It includes a folding operation, part by part, for radial capacitors or a winding operation, part by part, for axial capacitors. The step for the formation of the solid electrolyte is the most difficult one. Several cycles of pyrolysis are needed (four in principle) and these cycles must take place under well-determined conditions of temperature and duration. These are operations that are very difficult to master, for the base product used is a very aggressive solution of manganese nitrate. The conversion into manganese dioxide has to be done very quickly. A post-forming operation is needed to repair the layer damaged by the nitrate.

There is also a method, known from the patent FR 1 496 345, for the fabrication of the anode of an electrolytic capacitor with a wire of an anodizable metal. According to this patent, the metal wire is first of all subjected to a stream of particles of a hard material. One of the ends of the wire thus processed is slipped into a blind hole made in a compression piston. The rest of the wire is then in the cavity of the compression sleeve associated with the punch. With the bottom of the sleeve being blocked, the piston is pushed towards the bottom of the cavity, and this has the effect of compacting the wire. Thus, a block with a large active surface is obtained. To bring the block out of its housing, the bottom of the cavity is opened and the piston continues its forward movement to push out the anode block. This block is detached from the piston and is ready to undergo the operation of forming the oxide layer.

This method has several major drawbacks. It is hard to apply it on an industrial scale because of the use of determined lengths of wire, which are difficult to handle and insert into the hole of the piston. The present trend towards miniaturization makes it imperative to have anodes of small sizes (of the order of some mm$^3$). This makes it practically impossible to make the device for the implementation of the method, for to have a sufficient active surface of anode, it is necessary to use a metal wire with a diameter of the order of 0.2 mm for a length which may be 500 mm. Under these conditions, it is extremely difficult to make a piston pierced with a blind hole and a sleeve with appropriate dimensions. Finally, the density of pressure is not homogeneous, because of the friction that occurs between the external surface of the block being compressed and the walls of the sleeve. This friction is all the greater as the block being compacted is long and as, until the compacting is completed, it remains slightly elastic.

In order to overcome these drawbacks, the Applicant has conceived an original method enabling the compacting of small-sized blocks of anodes at a high rate. The device made to implement the method according to the invention also enables the resolving of the problems due to the density of pressure.

SUMMARY OF THE INVENTION

An object of the invention, therefore, is a method for the fabrication of wire anodes for electrolytic capacitors, the wires being obtained by the compacting of a wire, made of anodizable material, in the cavity of a compression sleeve under the effect of a piston, the wire going through the piston from one side to the other along the axis of its movement and through the sleeve by passing into its cavity, the method comprising the following operations for the making of an anode:

a) blocking the bottom of the cavity and fixing the wire at this level;

b) securing the wire with respect to the piston, which is in its raised position;

c) compacting the wire in the cavity by pushing the piston in;

d) disconnecting the wire and the piston;

e) if necessary, repeating the operations b) to d) until the desired anode length is obtained;

f) opening the bottom of the cavity and pushing the anode obtained out of the cavity by means of the piston;

g) raising the piston up to its raised position, with the previously obtained anode remaining in its pushed-out position, to start the fabrication of the next anode.

Another object of the invention is a device for the implementation of the above method, wherein the piston is pierced with an axial hole enabling the passing through of the wire that is to be compacted, the device also including means to block the bottom of the cavity on which the wire is compacted and means to secure the wire with respect to the piston.

BRIEF DESCRIPTION OF THE DRAWINGS

The invention will be understood more clearly and other advantages will appear from the reading of the following description, given as a non-restrictive example, and from the appended figures of which:

FIG. 1 shows a device for the implementation of the method according to the invention;

FIGS. 2 and 3 show the device according to the invention during operation;

FIG. 4 is a graph pertaining to a method according to the prior art;

FIG. 5 is a graph pertaining to a method according to the invention.

DESCRIPTION OF PREFERRED EMBODIMENTS

FIG. 1 shows a device for the implementation of the method according to the invention. The device includes chiefly fixed compression sleeve 1, pierced from one side to the other by a cavity 2 in which a piston 3, shown herein in its raised position, can slide. The cavity 2 has a widened portion 4 to facilitate the insertion of the piston. One of the major characteristics of the invention is that it provides for continuous working with a coil of metal wire and for the fabrication of the anodes without any need to stop the device in order to handle or cut the wire. To this end, the piston 3 is provided with an axial hole through which the wire 5 passes. As FIG. 1 shows, the wire, which is fed into the device from above, neither undergoes any deviation nor is it pulled back. It falls naturally into the cavity 2 when it is unwound from its coil. The fact that it reaches the compression cavity in the axis of this cavity prevents it from being jammed between the piston and the wall of the cavity.

The device also has different elements enabling the implementation of the method according to the invention. These elements may be those illustrated by FIG. 1:

a clamp 6 enabling the bottom of the cavity to be blocked and the wire 5 to be gripped at this level;

a clamp 7 enabling the wire to be gripped and to be secured with respect to the piston;

a clamp 8 making it possible to hold the anode that has been shaped and pushed out of the cavity when the piston rises up again.

In the exemplary embodiment shown in FIG. 1, the upper end of the piston 3 forms a collar 9 that takes position in a recess of the slider 10 which moves vertically with piston 3 attached at 13 to the slider. A part 11, fixed to the slider 10 at 14, blocks the collar 9 in recess 10. It is pierced with a hole in the axis of the piston to enable the wire 5 to pass through. The clamp 7 is horizontally movable but is vertically fixed at point 15 to the part 11 so that the assembly formed by the clamp 7, slider 10 and the part 11 move vertically as a unit. Thus, when the clamp 7 is closed, the wire 5 is secured with respect to the piston and is driven by its motion.

One of the advantages of the invention is that it enables the compacting of the anodes through operation by successive stages at constant pressure. Thus, the piston 3 may be driven by a to-and-fro motion under constant pressure through the slider 10.

The fabrication method according to the invention comprises the following operations. It is assumed that the wire 5, which may be etched and already oxidized, goes through the piston and the sleeve as is shown in FIG. 1. The axial hole of the piston into which the wire passes has a diameter that is preferably slightly greater than the diameter of the wire so that the wire passes through without resistance but does not tend to go back into the hole during the compression.

The clamp 6 is vertically fixed to sleeve 1 and selectively undergoes horizontal clamping motion. The clamp 6 which blocks the bottom of the cavity 2 is closed while, at the same time, the wire 5 is gripped at this level. Since the slider 10 is in the high piston (with the position in the raised position), the clamp 7 is closed. This has the consequence of securing the wire with respect to the piston.

The piston 3 is then pushed towards the bottom of the cavity to obtain the compacting of the wire 5. It may be advantageous to do the compacting in several stages. In this case, after having compacted a determined length of wire, corresponding to a fraction of an anode, the clamp 7 is opened and the piston 3 is taken up to the raised position, while the clamp 6 remains closed. The clamp 7 is then closed again and the piston is actuated to compact a new anode fraction which will be added to the first one. By repeating these operations, it is possible to obtain a complete anode. The clamp 7 is then opened.

To push out the anode made, the clamp 6 is opened and the piston 3 is pushed a little further to bring out the anode until it is placed in the unoccupied space formed by the vertically stationary clamp 8 in the open position. This is what is shown in FIG. 2, where the anode is shown under the reference 12. The clamp 8 is then closed to retain the anode 12 and the piston 3 can go up again to the raised position.

An anode fabrication cycle can start again with the closing of the clamp 6 to block the bottom of the cavity and retain the wire 5. The clamp 8 can return to the open position.

FIG. 3 shows the device according to the invention during operation. Two prepared anodes 12 can be seen in this figure. One anode is being made. It is seen that the clamps 6 and 7 are closed, and that the clamp 8 is open. To compact a little more of wire length, the clamp 7 will open and the piston 3 will rise again, by means of the slider 10, up to its raised position.

A major advantage of the invention lies in the ability to compact the wire in successive steps, for if it is desired to do a compaction in only one operation as taught by the patent FR 1 496 345, then the density of pressure is not homogeneous in the block forming the anode. The result thereof is that the impregnation of the anode by an electrolyte will be done differently depending on whether the anode parts are more compressed or less compressed. There is even a limit of pressure beyond which the impregnation can no longer take place.

FIG. 4 shows a graph giving the differential of pressure P, corresponding to the force F exerted by the piston on opposite ends of the anode block being formed according to the prior art, as a function of the anode length L to be obtained. To the left of this graph, and in relation with it, we have shown an anode block obtained according to the prior art. This anode block has a section S. Under the effect of a force F exerted by the piston, the pressure existing on the upper face of the anode block is $P_0$ and the pressure existing at the base of the anode block is $P_1$. Because of the frictional forces on the walls of the cavity, the pressure $P_1$ is lower than $P_0$ by the differential value $\Delta P$. In the graph, we have shown the limit value $\Delta P_L$ of pressure differential which should not be exceeded for the impregnation to be done properly. For a force $F_1$ exerted on the piston, the maximum length of anode that can be achieved will therefore be $L_1$. For a force $F_2$ which is greater than $F_1$ and, consequently, causes greater friction, the maximum length of anode that can be achieved will be $L_2$ which is less than $L_1$. It would therefore appear that the method according to the prior art as well as the device for its implementation do not leave any great freedom of action.

FIG. 5 represents the same type of graph as that of FIG. 4, but one for the forming of an anode block according to the invention. Each anode block exemplified has been formed in five successive compression operations, each of which adds a differential length to an anode block being formed. It is therefore constituted by five colinear parts that are superimposed but form a whole. For each of these parts, the pressure existing at its differential base base during the compacting is $P'_1$ and the pressure existing at its upper differential face is $P_0$. Since the height of each part of the anode block is small, the pressure $P'_1$ is only slightly smaller than $P_0$. Theoretically, there is no limit to the anode length that can be made since the pressure differential never reaches the limit density as can be seen in the graph of FIG. 5, for each time a new part of the anode starts forming, the pressure differential gets cancelled.

The anodes obtained by the method according to the invention are delivered continuously as a string of anodes. They undergo processing operations, well known to those skilled in the art, for the making of electrolytic capacitors. They can either be detached from one another and processed individually or they can undergo certain processing operations before being separated.

The invention can be applied to any type of anodizable metal and, especially, to aluminium and tantalum.

The invention enables the use of metallic wire in a continuous operation; this is very important for rational industrial-scale application.

The packing and compacting of the wire into the cavity can be done in successive steps. There is no mechanical limit to the making of the different elements of the device (piston, sleeve). Every format of anode is possible (in terms of shape and dimensions). The metallic wire used may be very thin. This has the advantage of increasing the active surface of the anode.

The invention can also be used to achieve the most efficient possible density of pressure with respect to the electrolyte that will be used, in order to optimize the impregnation.

What is claimed is:

1. A method for the fabrication of wire anodes for electrolytic capacitors, the anodes being obtained by the compression of a wire, made of anodizable material, in the cavity of a compression sleeve under the effect of a piston, the wire going through the piston from one side to the other along the axis of its movement and through the sleeve by passing into its cavity, the method comprising the following operations for the making of an anode:
    a) blocking the bottom of the cavity and fixing the wire at this level;
    b) securing the wire with respect to the piston, which is in its raised position;
    c) compressing the wire in the cavity by pushing the piston in;
    d) disconnecting the wire and the piston;
    e) repeating the operations b) to d) until the desired anode length is obtained;
    f) opening the bottom of the cavity and pushing the anode obtained out of the cavity by means of the piston;
    g) raising the piston up to its raised position, with the previously obtained anode remaining in its pushed-out position, to start the fabrication of the next anode.

2. The method set forth in claim 1 wherein the wire is etched and oxidized prior to being compressed.

3. A device for fabricating wire anodes for electrolytic capacitors, the anodes being obtained by the compression of a wire made of anodizable material, the device comprising:
    a sleeve having a cavity for receiving an axially movable piston;
    a through-bore axially formed through the length of the piston for slidably receiving a length of anode wire therethrough;
    first clamping means vertically fixed to the sleeve for clamping a lower end of an anode wire being formed thereby selectively fixing this end within the through-bore;
    second clamping means vertically fixed to the piston for selectively clamping an upper end of the anode wire within the piston;
    means coupled to the piston for axially reciprocating the piston several times consequently compressing the wire during multiple cycles in a free end of the cavity when the first and second clamping means are closed; and
    third clamping means for clamping a released formed section of the wire anode at the end of a compression cycle thereby permitting the device to form another anode along the length of a wire.

* * * * *